(12) United States Patent
Wang et al.

(10) Patent No.: US 6,302,458 B1
(45) Date of Patent: Oct. 16, 2001

(54) SELF-LOCKING TELESCOPE DEVICE

(75) Inventors: Jenne-Tai Wang, Troy; Gary Lee Jones, Farmington Hills, both of MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/702,138

(22) Filed: Oct. 31, 2000

(51) Int. Cl.[7] .................................................. B60R 19/26
(52) U.S. Cl. ...................... 293/132; 293/119; 293/133; 188/1; 74/492
(58) Field of Search .................... 293/132, 133, 293/118, 119; 188/371, 370, 377; 74/501.5 R, 501.5, 502.4, 502.6

(56) References Cited

U.S. PATENT DOCUMENTS

| | | | |
|---|---|---|---|
| 3,705,741 | * 12/1972 | White | 293/89 |
| 3,721,320 | * 3/1973 | Hirsch | 188/1 |
| 3,741,560 | * 6/1973 | Schaller | 188/1 |
| 3,788,148 | * 1/1974 | Connell et al. | 188/1 |
| 3,848,886 | * 11/1974 | Feustel et al. | 293/60 |
| 4,272,114 | * 6/1981 | Horano et al. | 293/133 |
| 4,679,837 | * 7/1987 | Bayer et al. | 293/132 |
| 4,786,459 | * 11/1988 | Mundo | 293/132 |
| 4,886,295 | * 12/1989 | Browne | 74/492 |
| 5,273,330 | * 12/1993 | Petry et al. | 293/132 |
| 5,370,429 | 12/1994 | Reuber et al. | 293/119 |
| 5,732,801 | * 3/1998 | Gertz | 293/132 |
| 5,967,573 | * 10/1999 | Wang | 293/119 |
| 6,217,090 | * 4/2001 | Berzinji | 293/132 |

* cited by examiner

*Primary Examiner*—Joseph D. Pape
*Assistant Examiner*—Kiran B. Patel
(74) *Attorney, Agent, or Firm*—Jeffrey A. Sedlar; George A. Grove

(57) ABSTRACT

A self-locking telescoping device including an outer tube, an inner tube telescoped into the outer tube having a cone-shaped ramp at an inboard end, and a plurality of metal spheres between the ramp and the outer tube. The metal spheres wedge between the ramp and the outer tube when the inner tube is thrust into the outer tube in a collapse direction thereby locking the tubes together. When the thrust is attributable to a severe impact, the spheres plastically deform the outer tube by plowing tracks therein thereby to absorb energy. The self-locking telescoping device further includes an actuator rod, a driver which translates the actuator in the collapse direction and in an expansion direction, a first clutch which translates the inner tube with the actuator rod in the expansion direction, a second clutch which translates the inner tube with the actuator rod in the collapse direction, and a tubular retainer on the actuator rod having a plurality of closed-ended slots around the metal spheres. The closed ends of the slots prevent the spheres from becoming wedged between the ramp and the outer tube when the second clutch translates the inner tube with the actuator rod in the collapse direction.

7 Claims, 4 Drawing Sheets

SELF-LOCKING TELESCOPE DEVICE

TECHNICAL FIELD

This invention relates to a self-locking telescoping device capable of functioning under impact as an energy absorber.

BACKGROUND OF THE INVENTION

A motor vehicle typically includes a bumper bar and an energy absorber which supports the bumper bar on a body of the motor vehicle for translation though a relatively short energy-absorbing stroke in response to a low speed impact on the bumper bar. During the energy-absorbing stroke, a fraction of the kinetic energy of the impact is converted by the energy absorber into work. In a high speed impact on the bumper bar, however, its short energy-absorbing stroke is quickly traversed and most of the kinetic energy of the impact is converted into work by plastic deformation of body structure of the motor vehicle behind the bumper bar. As motor vehicles have become more compact, the energy-absorbing capability of their body structures has decreased due to the smaller span between the vehicle's passenger compartment and bumper bar. A telescoping device described in U.S. Pat. No. 5,370,429 supports a bumper bar close to a body of a motor vehicle except when sensors on the vehicle detect an impending impact. Then, the telescoping device extends the bumper bar out from the body to maximize the energy-absorbing stroke of the bumper bar. During the energy-absorbing stroke, hydraulic fluid is throttled through an orifice of the telescoping device to absorb a fraction of the kinetic energy of the impact. The telescoping device described in the aforesaid U.S. Pat. No. 5,370,429 is not "self-locking", i.e., does not become structurally rigid in compression under any circumstances, and requires a fluid reservoir and fluid seals which may leak during the service life of the device. Accordingly, manufacturers continue to seek improved telescoping devices which are self-locking and which are also suitable for use as bumper energy absorbers.

SUMMARY OF THE INVENTION

This invention is a new and improved self-locking telescoping device including a stationary outer tube, an inner tube telescoped into the outer tube having a cone-shaped ramp at an inboard end thereof, and a plurality of metal spheres between the cone-shaped ramp and the outer tube. The metal spheres become wedged between the cone-shaped ramp and the outer tube when the inner tube is thrust into the outer tube in a collapse direction corresponding to a decrease in the length of the telescoping device thereby locking the inner and outer tubes together and rendering the telescoping device structurally rigid in the collapse direction. When the thrust is attributable to a severe impact on the inner tube, the spheres plastically deform the outer tube by plowing tracks therein thereby to convert into work a fraction of the kinetic energy of the impact. The self-locking telescoping device further includes an actuator rod, a driver which translates the actuator in the collapse direction and in an opposite expansion direction corresponding to an increase in the length of the telescoping device, a first clutch which translates the inner tube as a unit with the actuator rod in the expansion direction, a second clutch which translates the inner tube as a unit with the actuator rod in the collapse direction, and a tubular retainer on the actuator rod having a plurality of closed-ended slots around respective ones of the metal spheres. The ends of the slots prevent the spheres from becoming wedged between the cone-shaped ramp and the outer tube when the second clutch translates the inner tube as a unit with the actuator rod in the collapse direction.

DESCRIPTION OF THE PREFERRED EMBODIMENT

Figure 1:
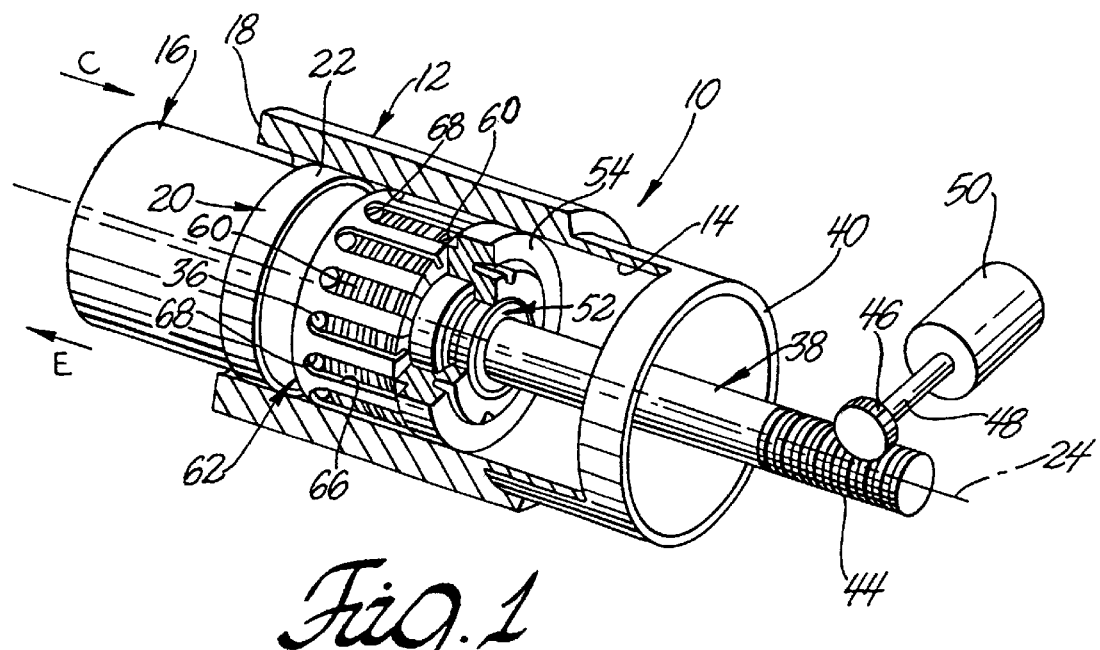
FIG. 1 is a partially broken-away perspective view of a self-locking telescoping device according to this invention.
Figure 2:
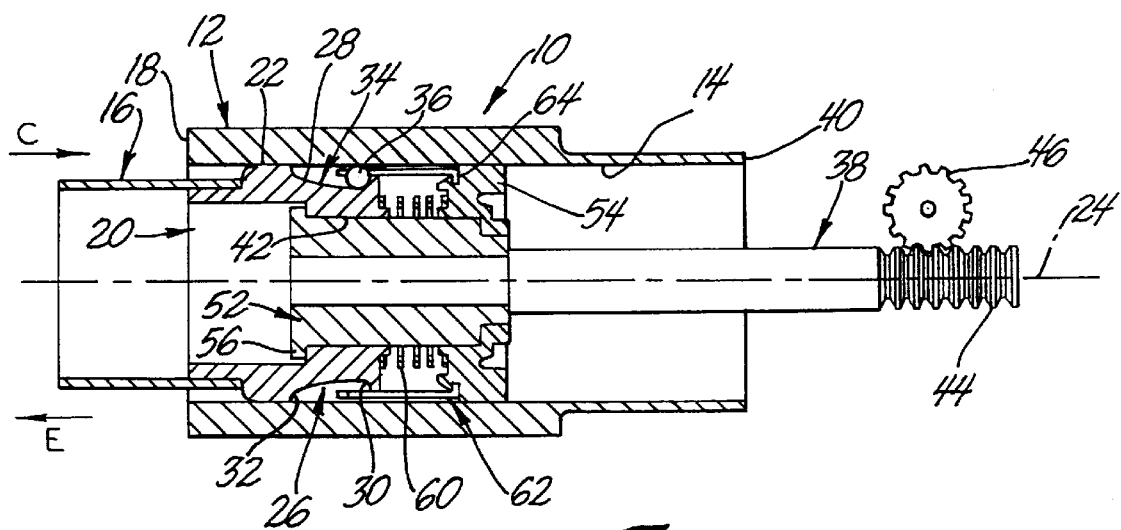
FIG. 2 is a longitudinal sectional view of the self-locking telescoping device according to this invention.
Figure 3:
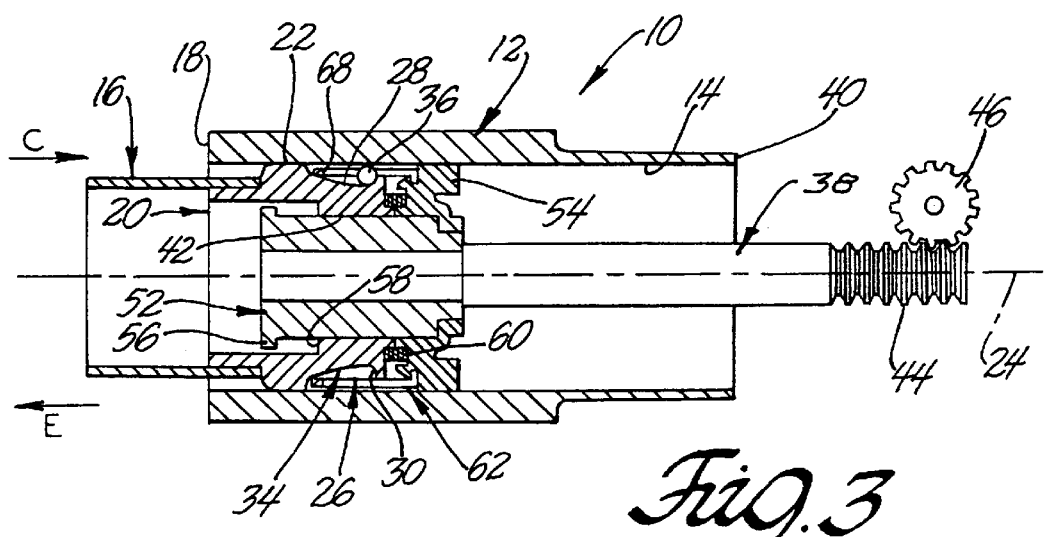
FIG. 3 is similar to FIG. 2 showing structural elements of the self-locking telescoping device according to this invention in different relative positions.

Referring to FIGS. 1–3, a self-locking telescoping device 10 according to this invention includes a stationary outer tube 12 having an inside cylindrical wall 14 and an inner tube 16 telescoped into the outer tube through an end 18 of the latter. An end fitting 20 rigidly attached to the inner tube constitutes an inboard end thereof in the outer tube and includes an outside cylindrical wall 22 bearing against and cooperating with the inside cylindrical wall 14 of the outer tube in supporting the inner tube on the outer tube for translation in an expansion direction "E" corresponding to an increase in the length of the device 10 and in a opposite collapse direction "C" corresponding to a decrease in the length of the device each parallel to a longitudinal centerline 24 of the outer tube.

An annular groove 26 in the outside cylindrical wall 22 of the end fitting 20 includes a bottom 28, a small diameter end 30, and a big diameter end 32. The bottom 28 of the groove annular flares outward, i.e., toward the inside cylindrical wall 14, from the small diameter end 30 to the big diameter end 32 and constitutes a cone-shaped ramp 34 on the inner tube at the inboard end thereof. A plurality of hard steel spheres 36 are disposed in the annular groove 26.

During translation of the inner tube 16 in the expansion direction "E", the spheres 36 are cupped in the annular groove 26 against the small diameter end 30 thereof, FIG. 2, where they slide along the inside cylindrical wall 14 of the outer tube without obstructing translation of the inner tube. Conversely, at the onset of translation of the inner tube in the collapse direction "C", the spheres roll up the cone-shaped ramp 34 and quickly become wedged between the cone-shaped ramp and the inside cylindrical wall 14 of the outer tube thereby effectively locking the inner and the outer tubes together and rendering the self-locking telescoping device structurally rigid in the collapse direction "C".

When the thrust on the inner tube in the collapse direction "C" is attributable to an extreme impact on the inner tube, the telescoping device 10 functions as an energy absorber. That is, with the steel spheres 36 wedged between the cone-shaped ramp and the inside cylindrical wall of the outer tube, and the self-locking telescoping device therefore structurally rigid in the collapse direction "C", the steel spheres plastically deform the outer tube 12 by rolling tracks therein when the thrust attributable to the extreme impact exceeds the yield strength of the material from which the outer tube 12 is constructed. Such plastic deformation absorbs energy by converting into work a fraction of the kinetic energy of the impact.

Figure 9:
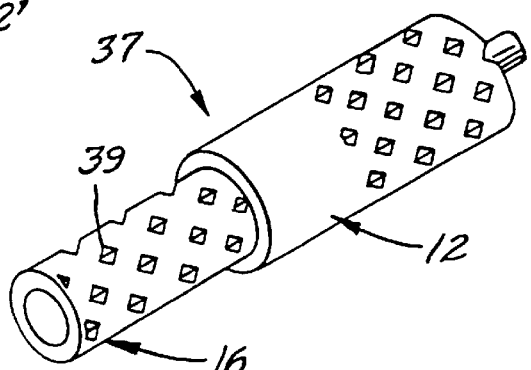
FIG. 9 is a fragmentary perspective view of another modified embodiment of the self-locking telescoping device according to this invention.

In a modified self-locking telescoping device 37 according to this invention, FIG. 9, the inner and outer tubes 16,12 are interrupted by a plurality of perforations 39. The interstices between the perforations 39 constitute crush initiators. With the steel spheres 36 wedged between the cone-shaped ramp and the inside cylindrical wall of the outer tube, and the self-locking telescoping device therefore structurally rigid in the collapse direction "C", the outer tube plastically deforms at the crush initiators when the thrust attributable to the extreme impact exceeds the yield strength of the material from which the outer tube 12 is constructed. Such plastic deformation absorbs energy by converting into work a fraction of the kinetic energy of the impact.

The self-locking telescoping device 10 further includes an actuator rod 38 telescoped into a second end 40 of the outer tube 12 and into a bore 42 in the end fitting 20 on the inner tube. The actuator rod has a rack gear 44 thereon which meshes with a pinion gear 46. The pinion gear 46 is connected by a pinion shaft 48 to a prime mover in the form of an electric motor 50 so that the motor, the pinion gear, and the rack gear constitute a drive means operable to translate the actuator rod back and forth in the expansion and collapse directions "E", "C" of the inner tube.

A tubular hub 52 is rigidly attached to the actuator rod 38 and supports the actuator rod in the bore 42 in the end fitting 20 for translation relative to the inner tube in the direction of the longitudinal centerline 24 of the outer tube. A ring 54 is rigidly attached to the hub 52 at the end thereof facing the rack gear 44 on the actuator rod and cooperates with the inside cylindrical wall 14 of the outer tube in supporting the actuator rod on the outer tube for back and forth translation in the expansion and collapse directions "E", "C" of the inner tube. An annular flange 56 on the end of the hub 52 opposite the ring 54 faces an annular shoulder 58, FIG. 3, on the end fitting 20 around the bore 42. A compression spring 60 seats against the ring 54 and against the end fitting 20 and biases the end fitting and the actuator rod in opposite directions until the annular flange 56 seats against the annular shoulder 58.

A tubular retainer 62 of the telescoping device 10 surrounds the compression spring 60 and overlaps the gap between the end fitting 20 and the ring 54. The retainer includes a hooked end 64, FIG. 2, seated in a corresponding annular groove in the ring 54 whereby the retainer is rigidly attached to the ring and, therefore, to the actuator rod 38. The tubular retainer has a plurality of slots 66, FIG. 1, parallel to the longitudinal centerline 24 of the outer tube each of which terminates at a closed end 68. Each slot receives a corresponding one of the spheres 36 and has a length calculated to locate its closed end 68 close to the corresponding sphere when the spring 60 thrusts the annular flange 56 on the hub 52 against the annular shoulder 58 on the end fitting 20, FIG. 2.

The ring 54 and the spring 60 constitute a first clutch which effects unitary translation of the actuator rod and the inner tube in the expansion direction "E" in response to corresponding rotation of the pinion gear 46. That is, when the pinion gear rotates clockwise, FIGS. 2–3, the thrust applied to the actuator rod is transferred to the end fitting 20 through the ring 54 and the spring 60 and urges the inner tube in the expansion direction "E". At the same time, the spheres 36 remain cupped against the small diameter end 30 of the annular groove 26 where they slide along the inside cylindrical wall 14 of the outer tube without interfering with translation of the outer tube. If the actuator rod translates in the expansion direction "E" relative to the inner tube because of friction between the inner and outer tubes, the closed ends 68 of the slots 66 in the retainer 62 separate harmlessly from the spheres 36 until the thrust on the inner tube exceeds the friction.

Conversely, the annular flange 56 on the hub and the annular shoulder 58 on the end fitting 20 constitute a second clutch which effects unitary translation of the actuator rod and the inner tube 16 in the collapse direction "C" in response to corresponding rotation of the pinion gear 46. That is, when the pinion gear rotates counterclockwise, FIGS. 2–3, the thrust applied to the actuator rod 38 is transferred directly to the end fitting through the flange 56 and the annular shoulder 58 and urges the inner tube in the collapse direction "C". At the same time, the ring 54 translates with the actuator rod in the collapse direction "C" so that the retainer 62 and the end fitting 20 translate as a unit in the same direction. In that circumstance, the closed ends 68 of the slots 66 prevent the spheres 36 from rolling up the cone-shaped ramp 34 and thus prevent the spheres from becoming wedged between the end fitting 20 and the outer tube 14 and interfering with translation of the inner tube in the collapse direction "C".

Figure 4:
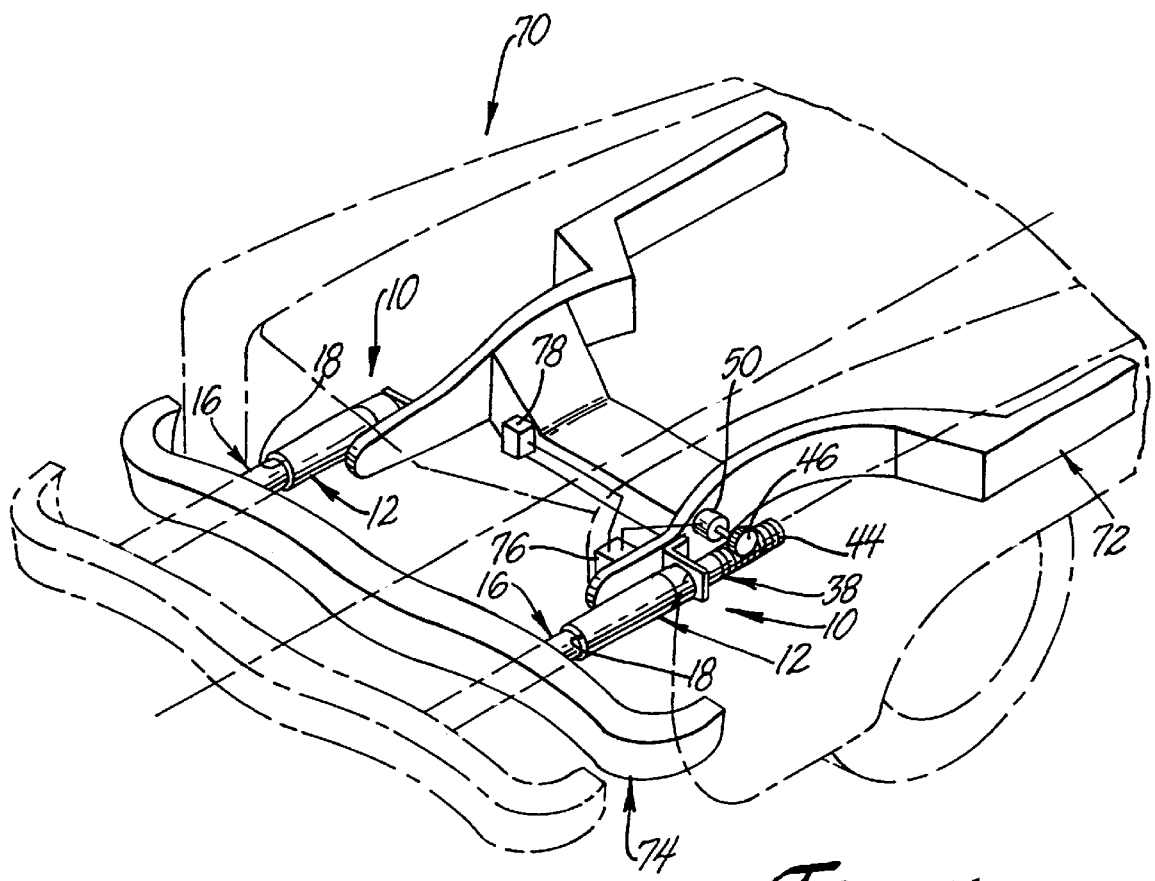
FIG. 4 is a perspective view of the self-locking telescoping device according to this invention in a motor vehicle bumper energy absorber application.
Figure 5:
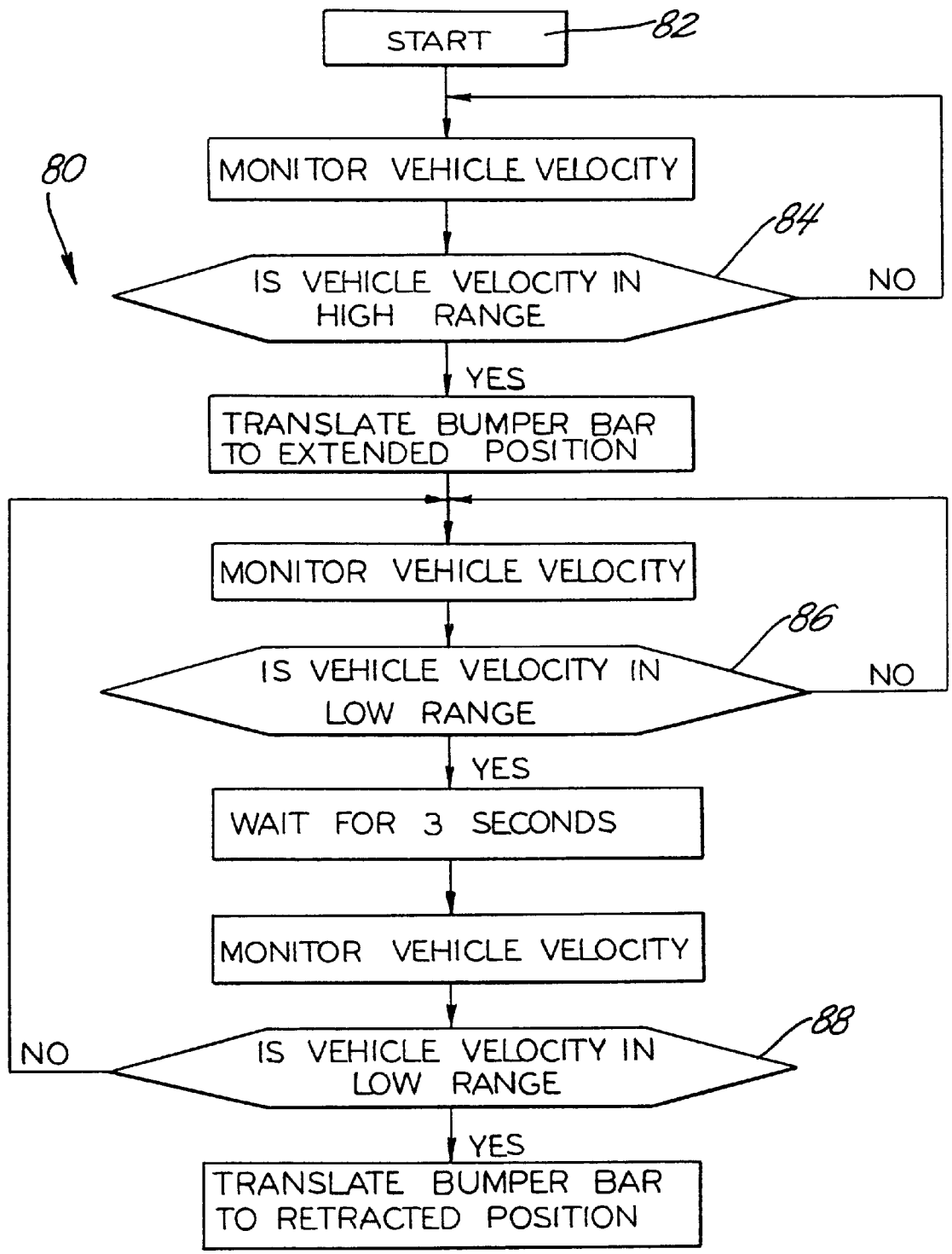
FIG. 5 is a graphic representation of an algorithm controlling the self-locking telescoping device according to this invention in the motor vehicle bumper energy absorber application.

Referring to FIGS. 4–5, a pair of the self-locking telescoping devices 10 are illustrated in a bumper energy absorber application on a schematically represented motor vehicle 70 having a frame 72 and a bumper bar 74. The outer tubes 12 are rigidly attached to the frame 72 on opposite sides of thereof and the inner tubes 16 are rigidly attached to the bumper bar. An electronic control module (ECM) 76 on the motor vehicle is connected to each of the electric motors 50 and to a transducer 78 which provides electronic signals to the ECM corresponding to the velocity of the motor vehicle. When the ECM 76 turns on the electric motors to rotate the pinion gears 46 in the expansion direction "E" of the inner tubes, the bumper bar 74 is translated by the actuator rods and the inner tubes from a retracted position to an extended position, illustrated respectively in solid and broken lines in FIG. 4, in which the bumper bar protrudes further in front of the frame 72. When the ECM turns on the electric motors to rotate the pinion gears in the collapse direction "C" of the inner tubes, the bumper bar is translated by the actuator rods and the inner tubes from its extended position back to its retracted position.

With the electric motors 50 turned off and the bumper bar in its extended position, a severe impact on the bumper bar 74 initiates translation of the inner tubes 16 of the devices 10 in the collapse direction "C" relative to the outer tubes and the actuator rods. The end fittings 20 plunge toward the rings 54 against the resistance of the springs 60 while the closed ends 68 of the slots 66 in the tubular retainers separate from the spheres 36, FIG. 3. The spheres then roll up the cone-shaped ramps 34, become wedged against the inside cylindrical walls 14 of the outer tubes, and commence plowing tracks in the outer tubes to convert into work a fraction of the kinetic energy of the impact on the bumper bar.

A flow chart 80, FIG. 5, depicts an algorithm according to which the ECM 76 turns the electric motors 50 on and off including a start block 82 initiated when the electrical system of the motor vehicle is turned on with the bumper bar in its retracted position. From the start block 82, the algorithm monitors the velocity of the motor vehicle through an electrical signal from the transducer 78 and asks at a decision block 84 whether the velocity of the motor vehicle is in a high range, e.g., above 15 miles per hour (MPH), in which a high speed impact is possible. If the answer is no, the ECM does not turn on the electric motors and the bumper bar remains in its retracted position. If the answer is yes, the algorithm turns on the electric motors through the ECM to translate the bumper bar 74 to its extended position more remote from the frame 72 where it affords increased protection against a high speed impact.

With the bumper bar in its extended position, the algorithm monitors the velocity of the motor vehicle through the electrical signal from the transducer 78 and asks at a decision block 86 whether the velocity of the motor vehicle is in a low range, e.g., less than 10 MPH, in which a high speed impact is improbable. If the answer is no, then the algorithm repeats the interrogation of vehicle velocity between the decision blocks 84,86. If the answer is yes, the algorithm interrogates vehicle velocity a second time after a delay of about three seconds and asks at a decision block 88 whether vehicle velocity is still in the low range. If the answer is no, then the algorithm repeats the interrogation of vehicle velocity between the decision blocks 84,86. If the answer is still yes, the algorithm turns on the electric motors 50 through the ECM to translate the bumper bar back to its retracted position.

Figure 6:
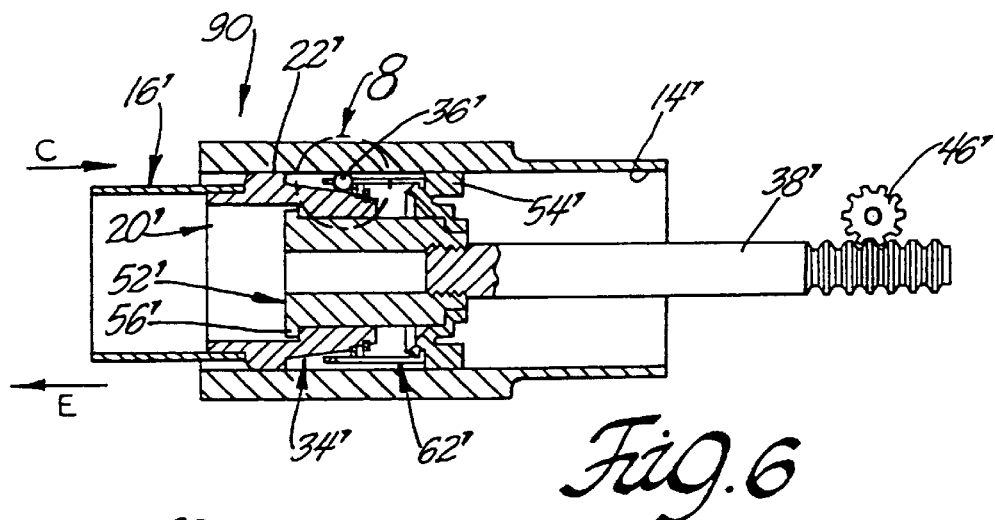
FIG. 6 is a longitudinal sectional view of a modified embodiment of the self-locking telescoping device according to this invention.
Figure 7:
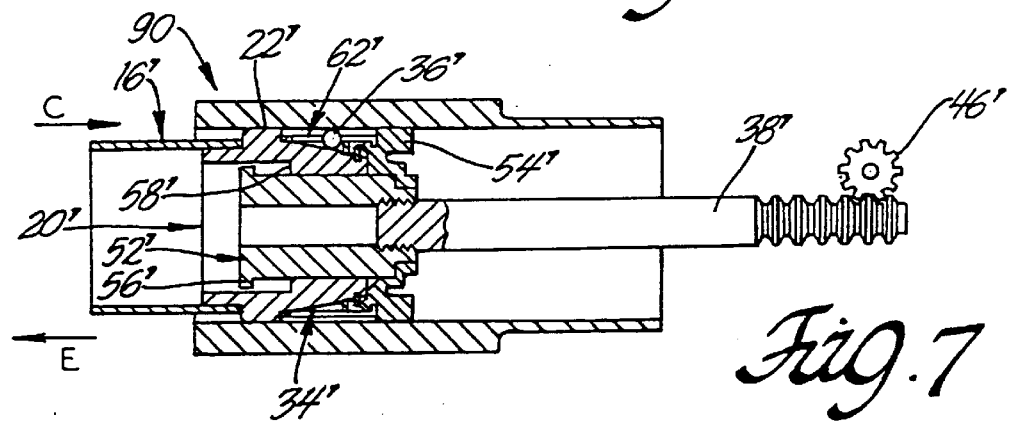
FIG. 7 is similar to FIG. 6 showing structural elements of the modified self-locking telescoping device according to this invention in different relative positions.
Figure 8:
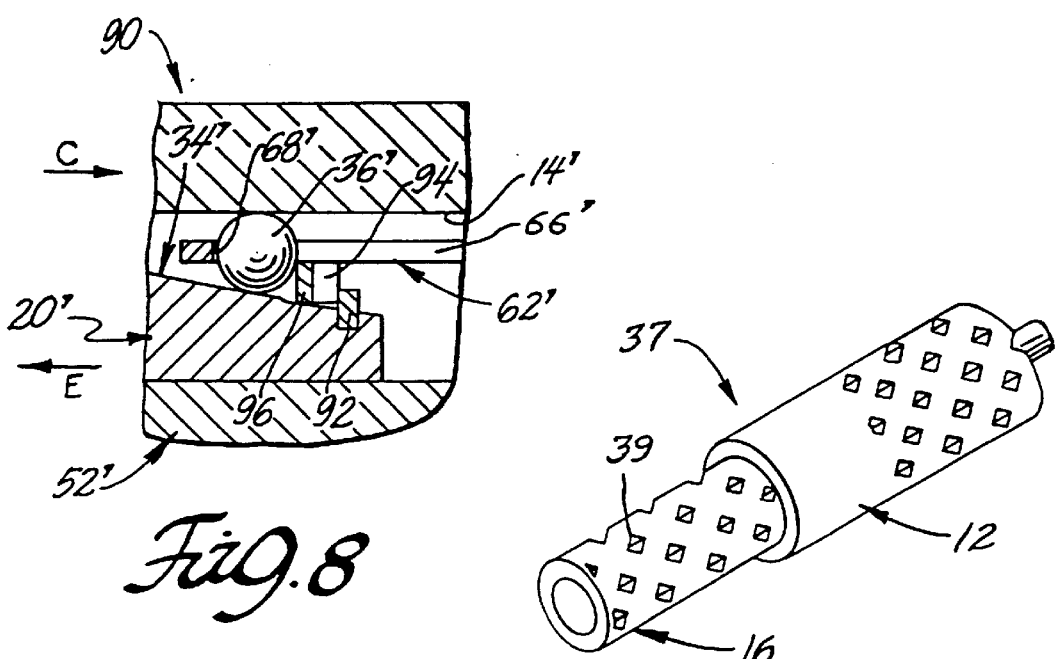
FIG. 8 is an enlarged view of the portion of FIG. 6 identified by the reference circle 8 in FIG. 6.

Referring to FIGS. 6–8, another modified self-locking telescoping device 90 according to this invention is identical to the self-locking telescoping device 10 described above except as now recited. Structural elements common to the device 10 and the modified device 90 are identified in FIGS. 6–8 with primed reference characters. In place of the compression spring 60 in device 10, the modified device 90 includes a retaining ring 92, an annular wave spring 94, and a thrust washer 96, FIG. 8, which constitute a preload means of the modified device. The retaining ring 92 is supported on the end fitting 20' on the inner tube 16' and constitutes the small diameter end of the annular groove in the outside cylindrical surface 22' of the end fitting. The thrust washer 96 loosely encircles the cone-shaped ramp 34' between the retaining ring 92 and the spheres 36'. The wave spring encircles the cone-shaped ramp between the retaining ring 92 and the thrust washer 96.

The pinion gear 46' translates the inner tube 16' of the modified self-locking telescoping device 90 in the collapse direction "C" through the actuator rod 38', the annular flange 56' on the hub 52', and the annular shoulder 58' on the end fitting 20'. At the same time, the closed ends 68', FIG. 8, of the slots 66' in the tubular retainer 62' prevent the spheres 36' from rolling up the cone-shaped ramp 34' and becoming wedged between the end fitting and the outer tube, FIG. 6, while maintaining the wave spring flexed in compression between the thrust washer and the retaining ring. When the pinion gear 46' rotates in the opposite direction to translate the actuator rod in the expansion direction "E", the inner tube 16' and the end fitting 20' remain stationary due to friction until the ring 54' on the actuator rod seats against the end fitting, FIG. 7. The ring and the end fitting thus constitute the aforesaid first clutch of the modified device 90 which translates the inner tube as a unit with the actuator rod in the expansion direction "E".

When the pinion gear 46' is stationary, thrust on the inner tube in the collapse direction "C" initiates translation of the end fitting in the same direction relative to the actuator rod while the closed ends of the slots in the retainer 62' separate from the spheres 36'. At the same time, the annular wave spring 94 separates the retaining ring 92 and the thrust washer 96 to positively and substantially instantly thrust the spheres 36' up the cone-shaped ramp 34' into wedging engagement between the end fitting and the inside cylindrical wall of the outer tube. The spheres 36' thus render the modified self-locking telescoping device 90 structurally rigid in the collapse direction "C" unless the Thrust is attributable to a severe impact on the inner tube. Then, the spheres plastically deform the outer tube by plowing tracks therein to convert into work a fraction of the kinetic energy of the impact.

What is claimed is:

1. An energy absorber between a motor vehicle body and a bumper bar comprising:

a stationary outer tube on the motor vehicle body, an inner tube rigidly attached to the bumper bar and telescoped into the outer tube through a first end of the outer tube and supported on the outer for translation in an expansion direction and in a collapse direction, a cone-shaped ramp on the inner tube at the inboard end thereof facing an inside cylindrical wall on the outer tube, an annular end wall on the inner tube at a small diameter end of the cone-shaped ramp, a plurality of spheres between the cone-shaped ramp and the inside cylindrical wall on the outer tube cupped against the annular end wall during translation of the inner tube in the expansion direction without interfering with translation of the inner tube in the expansion direction and rolling up the cone-shaped ramp into wedging engagement between the cone-shaped ramp and the inside cylindrical wall on the outer tube at the onset of translation of the inner tube in the collapse direction induced by an impact on the bumper bar, each of the plurality of spheres having a hardness sufficient to plastically deform the outer tube by plowing tracks therein when the impact on the bumper bar exceeds the yield strength of the material from which the outer tube is constructed thereby to convert into work a fraction of the kinetic energy of the impact on the bumper bar, an actuator rod telescoped into the outer tube through a second end of the outer tube and into the inner tube through an inboard end of the inner tube, a drive means on the motor vehicle operable to selectively translate the actuator rod in the expansion direction and in the collapse direction, a first clutch means operable to translate the inner tube as a unit with the actuator rod in the expansion direction, a second clutch means operable to translate the inner tube as a unit with the actuator rod in the collapse direction, and a tubular retainer on the actuator rod having a plurality of slots around respective ones of the plurality of spheres each having a closed end adjacent to the corresponding one of the spheres and engageable thereon when the drive means and the second clutch means translate the actuator rod and the inner tube in the collapse direction to prevent the corresponding sphere from rolling up the cone-shaped ramp and becoming wedged between the cone-shaped ramp and the inside cylindrical wall on the outer tube.

2. An energy absorber between a motor vehicle body and a bumper bar comprising:

a stationary outer tube on the motor vehicle body, an inner tube rigidly attached to the bumper bar and telescoped into the outer tube through a first end of the outer tube and supported on the outer for translation in an expansion direction and in a collapse direction, a cone-shaped ramp on the inner tube at the inboard end thereof facing an inside cylindrical wall on the outer tube, an annular end wall on the inner tube at a small diameter end of the cone-shaped ramp, a plurality of spheres between the cone-shaped ramp and the inside cylindrical wall on the outer tube cupped against the annular end wall during translation of the inner tube in the expansion direction without interfering with translation of the inner tube in the expansion direction and rolling up the cone-shaped ramp into wedging engagement between the cone-shaped ramp and the inside cylindrical wall on the outer tube at the onset of translation of the inner tube in the collapse direction induced by an impact on the bumper bar thereby to render the inner tube and the outer tube rigid relative to each other in the collapse direction, a plurality of perforations in at least one of the inner tube and the outer tube defining therebetween a plurality crush initiators where plastic deformation of the corresponding one of the inner and outer tubes is initiated after the steel spheres render the inner and the outer tubes rigid relative to each other in the collapse direction thereby to convert into work a fraction of the kinetic energy of the impact on the bumper bar, an actuator rod telescoped into the outer tube through a second end of the outer tube and into the inner tube through an inboard end of the inner tube, a drive means on the motor vehicle operable to selectively translate the actuator rod in the expansion direction and in the collapse direction, a first clutch means operable to translate the inner tube as a unit with the actuator rod in the expansion direction, a second clutch means operable to translate the inner tube as a unit with the actuator rod in the collapse direction, and a tubular retainer on the actuator rod having a plurality of slots around respective ones of the plurality of spheres each having a closed end adjacent to the corresponding one of the spheres and engageable thereon when the drive means and the second clutch means translate the actuator rod and the inner tube in the collapse direction to prevent the corresponding sphere from rolling up the cone-shaped ramp and becoming wedged between the cone-shaped ramp and the inside cylindrical wall on the outer tube.

3. The energy absorber recited in claim 1 or claim 2 wherein the first clutch means comprises:

a ring rigidly attached to the actuator rod, and a compression spring between the ring and the inboard end of the inner tube.

4. The energy absorber recited in claim 3 wherein the second clutch means comprises:

an annular shoulder on the inner tube, and an annular flange on the actuator rod facing the annular shoulder and engageable thereon in response to translation of the actuator rod in the collapse direction.

5. The energy absorber recited in claim 4 wherein the drive means comprises:

a rack gear on the actuator rod, a pinion gear meshing with the rack gear, and a prime mover on the motor vehicle operable to rotate the pinion gear in a first direction corresponding to translation of the actuator rod in the expansion direction and in a second direction corresponding to translation of the actuator rod in the collapse direction.

6. The energy absorber recited in claim 5 further comprising:

a preload means operable to positively thrust each of the spheres up the cone-shaped ramp into wedging engagement between the cone-shaped ramp and the inside cylindrical wall on the outer tube at the onset of translation of the inner tube in the collapse direction relative to the actuator rod.

7. The energy absorber recited in claim 6 wherein the preload means comprises:

a retaining ring on the inner tube constituting the annular end wall on the inner tube at the small diameter end of the cone-shaped ramp, a thrust washer around the cone-shaped ramp between the plurality spheres and the retaining ring, and a spring flexed in compression between the retaining ring and the thrust washer urging the plurality of spheres up the cone-shaped ramp into wedging engagement between the cone-shaped ramp and the inside cylindrical wall on the outer tube at the onset of translation of the inner tube in the collapse direction relative to the actuator rod.

* * * * *